(12) United States Patent
Yee

(10) Patent No.: US 9,274,606 B2
(45) Date of Patent: Mar. 1, 2016

(54) NUI VIDEO CONFERENCE CONTROLS

(71) Applicant: Microsoft Corporation, Redmond, WA (US)

(72) Inventor: Dawson Yee, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 13/828,558

(22) Filed: Mar. 14, 2013

(65) Prior Publication Data

US 2014/0267548 A1 Sep. 18, 2014

(51) Int. Cl.
| | |
|---|---|
| H04N 7/14 | (2006.01) |
| G06F 3/01 | (2006.01) |
| H04N 7/15 | (2006.01) |
| H04N 21/4223 | (2011.01) |
| H04N 21/4788 | (2011.01) |

(52) U.S. Cl.
CPC ................ G06F 3/017 (2013.01); H04N 7/142 (2013.01); H04N 7/147 (2013.01); H04N 7/15 (2013.01); H04N 21/4223 (2013.01); H04N 21/4788 (2013.01)

(58) Field of Classification Search
USPC .............................. 348/14.03, 14.07; 704/272
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Bian, et al., "Using Sound Source Localization to Monitor and Infer Activities in the Home", Retrieved on: Aug. 17, 2012, Available at: http://smartech.gatech.edu/xmlui/bitstream/handle/1853/3729/04-20.pdf?sequence=1.

(Continued)

*Primary Examiner* — Joseph J Nguyen
(74) *Attorney, Agent, or Firm* — Gregg Wisdom; Judy Yee; Micky Minhas

(57) ABSTRACT

A system and method providing gesture controlled video conferencing includes a local capture device detecting movements of a user in a local environment and an audio/visual display. A processor is coupled to the capture device and a remote capture device and a remote processor at a remote environment via a network. The local processor includes instructions to render a representation of the remote environment on the display responsive to the remote processor and remote capture device. The processor also tracks movements of a local user in a space proximate to the local capture device. Responsive to a user gesture detected at the local capture device, the audio or visual signals provided by the remote capture device are altered to change the representation of the remote location is altered locally.

20 Claims, 15 Drawing Sheets

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,590,941 B2 | 9/2009 | Wee et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,667,728 B2 | 2/2010 | Kenoyer et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |

(56) References Cited

U.S. PATENT DOCUMENTS

| | | | |
|---|---|---|---|
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,395,652 B1* | 3/2013 | Chapweske et al. | 348/14.05 |
| 2004/0068409 A1* | 4/2004 | Tanaka et al. | 704/272 |
| 2005/0038692 A1* | 2/2005 | Kane et al. | 705/10 |
| 2008/0026838 A1 | 1/2008 | Dunstan et al. | |
| 2009/0079813 A1 | 3/2009 | Hildreth | |
| 2009/0323981 A1 | 12/2009 | Cutler | |
| 2010/0118935 A1* | 5/2010 | Kakii et al. | 375/240.01 |
| 2011/0085016 A1 | 4/2011 | Kristiansen et al. | |
| 2011/0208807 A1* | 8/2011 | Shaffer | 709/203 |
| 2011/0300929 A1 | 12/2011 | Tardif et al. | |
| 2012/0075407 A1 | 3/2012 | Wessling | |
| 2012/0105358 A1* | 5/2012 | Momeyer et al. | 345/174 |
| 2012/0206558 A1* | 8/2012 | Setton | 348/14.03 |
| 2012/0317511 A1* | 12/2012 | Bell | 715/782 |
| 2013/0222369 A1* | 8/2013 | Huston et al. | 345/419 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2007/037700 A1 | 4/2007 |
| WO | 2010/120303 A2 | 10/2010 |

OTHER PUBLICATIONS

Zotkin, et al., "Accelerated Speech Source Localization via a Hierarchical Search of Steered Response Power", In Proceedings of the IEEE Transactions on Speech and Audio Processing, vol. 12, Issue 5, Aug. 2004, 20 pages.

"International Search Report & Written Opinion for PCT Application No. PCT/US2014/22493", Mailed Date: Jun. 4, 2014, Filed Date: Mar. 10, 2014, 11 Pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

* cited by examiner

NUI VIDEO CONFERENCE CONTROLS

BACKGROUND

In the past, computing applications such as computer games and multimedia applications have used controllers, remotes, keyboards, mice, or the like to allow users to manipulate game characters or other aspects of an application. More recently, computer games and multimedia applications have begun employing cameras and motion recognition to provide a human computer interface ("HCI"). With HCI, user gestures are detected, interpreted and used to control aspects of an application.

Video conferencing between processing devices such as computers, mobile phones and game consoles, allow users a more intimated conferencing experience. However, conferees are generally limited to experiencing that which is presented by those they are conferring with. A local conferee is presented with the view and sounds based on the settings and positioning defined by any remote conferees.

SUMMARY

Technology is provided to enable a user experience interaction and navigation between a local conferee and a remote conferee using gesture based controls to improve a local user's experience of a remote conferee. A gesture controlled video conferencing apparatus includes a local capture device detecting movements of a user in a local environment and an audio/visual display. A processor is coupled to the capture device and a remote capture device and a remote processor at a remote environment via a network. The local processor includes instructions to render a representation of the remote environment on the display responsive to the remote processor and remote capture device. The processor also tracks movements of a local user in a space proximate to the local capture device. Responsive to a user gesture detected at the local capture device, the audio or visual signals provided by the remote capture device are altered to change the representation of the remote location is altered locally.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is provided to enable a user experience interaction and navigation between users participating in an audio/visual teleconference. The technology enables a local user to adjust the local user's audio visual experience through gesture controls which implement changes in a remote user's processing device. Gesture controlled video conferencing utilizes a local capture device detecting movements of a local user in a local environment and an audio/visual display. The local user may be in an audio/visual conference with a remote user via a network. A representation of the remote environment with the remote user is provided on a local display and responsive to movements of a local user in a space proximate to the local capture device, user gestures can alter audio or visual signals provided by the remote capture device to change the representation of the remote location on the local display. Audio and visual control gestures are provided.

Figure 1:
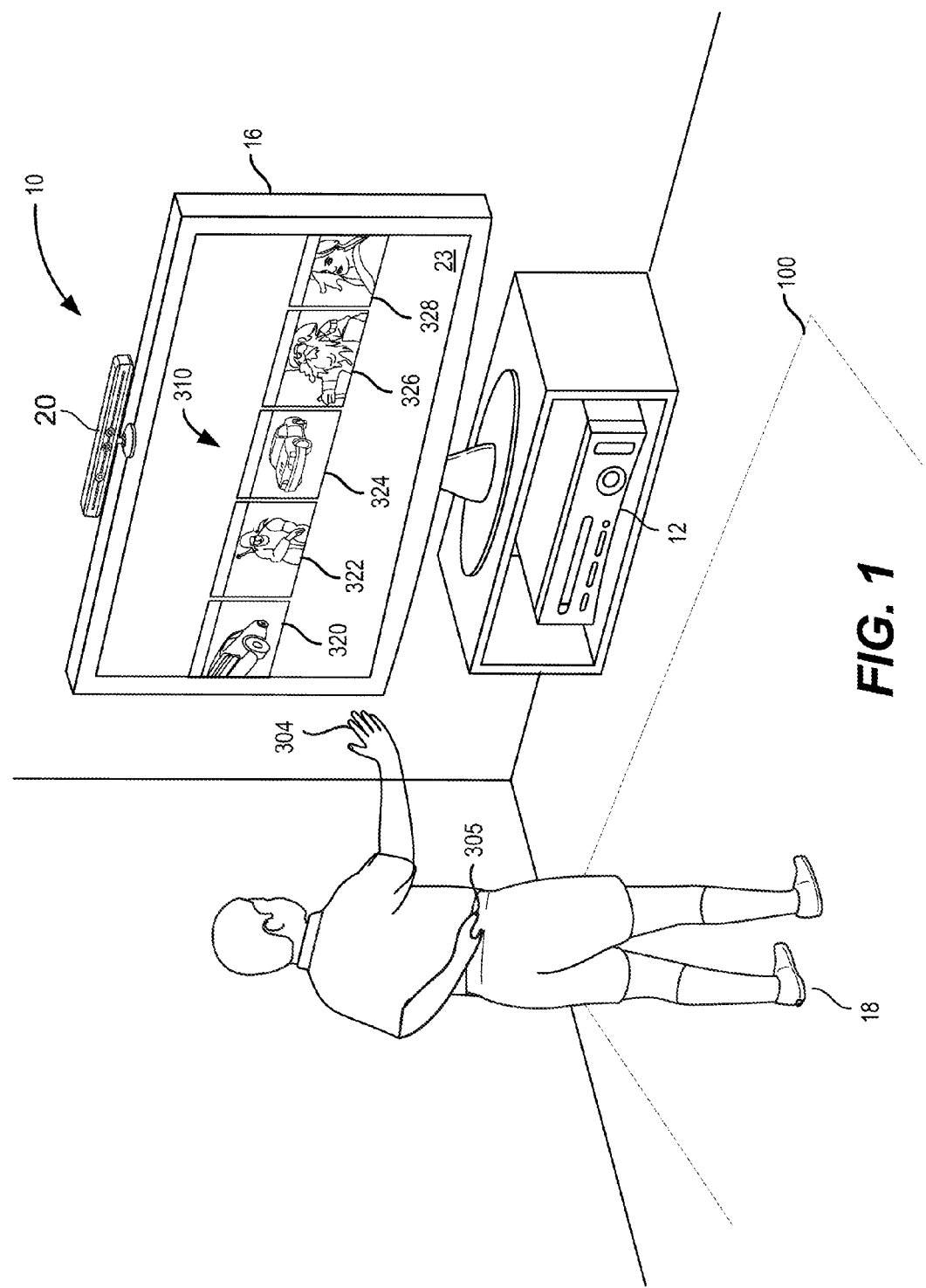
FIGS. 1 and 2 illustrate one embodiment of a target recognition, analysis and tracking system with a user performing a gesture to control a user-interface.
Figure 2:
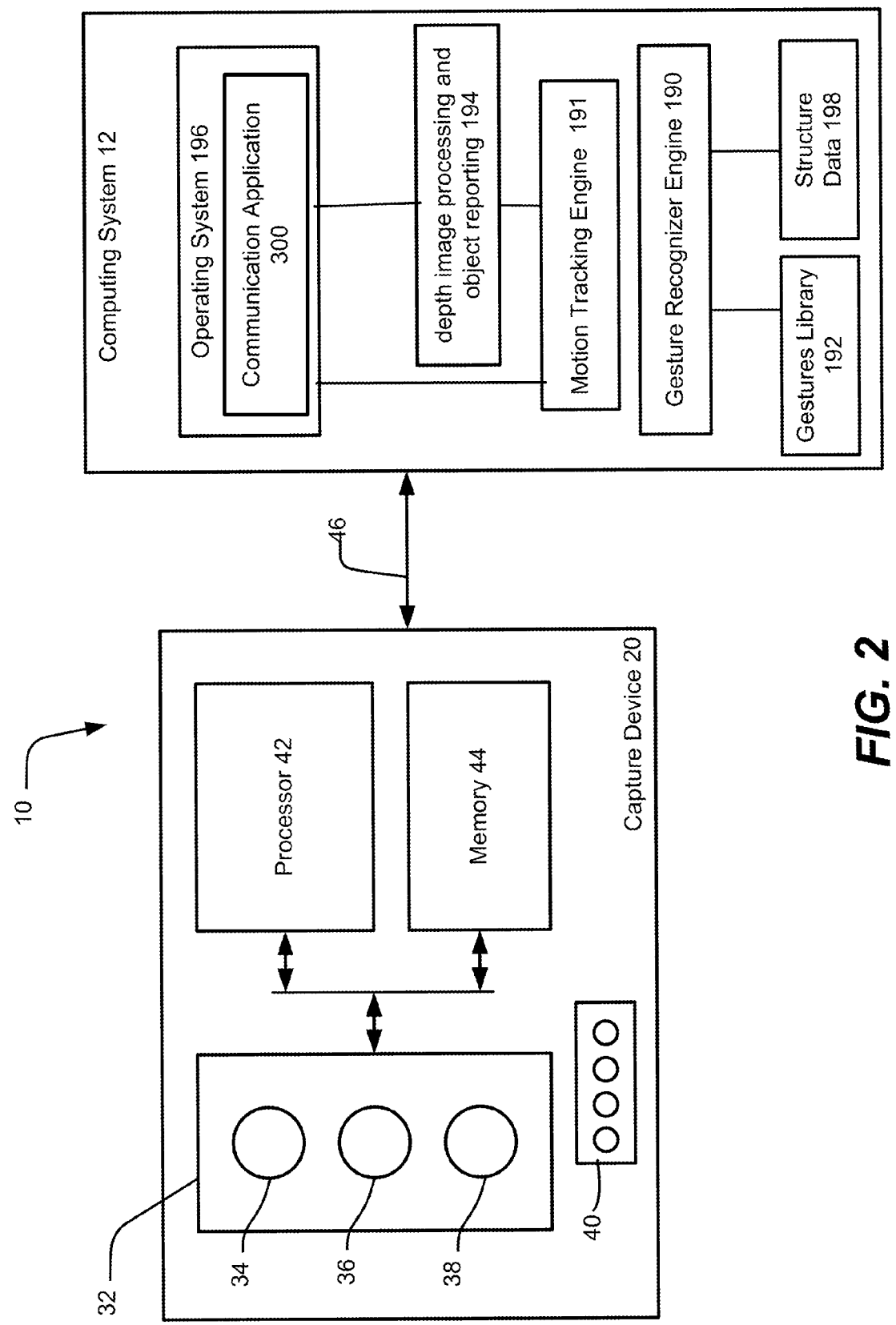

FIGS. 1 and 2 illustrate one embodiment of a target recognition, analysis and tracking system 10 (generally referred to as a tracking system hereinafter) with a user 18 interacting with a system user-interface 310. The target recognition, analysis and tracking system 10 may be used to recognize, analyze, and/or track a human target such as the user 18, and provide a human controlled interface.

As shown in FIG. 1, the tracking system 10 may include a computing environment 12. The computing environment 12 may be a computer, a gaming system or console, or the like. According to one embodiment, the computing environment 12 may include hardware components and/or software components such that the computing environment 12 may be used to execute an operating system and applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIGS. 1 and 2, the tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions for the user-interface of an operating system or application.

The capture device may be positioned on a three-axis positioning motor allowing the capture device to move relative to a base element on which it is mounted.

According to one embodiment, the tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1 and 2, the target recognition, analysis and tracking system 10 may be used to recognize, analyze, and/or track one or more human targets such as the user 18. For example, the user 18 may be tracked using the capture device 20 such that the movements of user 18 may be interpreted as controls that may be used to affect an application or operating system being executed by computer environment 12.

Some movements may be interpreted as controls that may correspond to actions other than controlling a player avatar or other gaming object. Virtually any controllable aspect of an operating system and/or application may be controlled by movements of the target such as the user 18. The player may use movements to select a game or other application from a main user interface. A full range of motion of the user 18 may be available, used, and analyzed in any suitable manner to interact with an application or operating system.

In FIGS. 1-2 user 18 is interacting with the tracking system 10 to control the system user-interface (UI) 23, which in this particular example is displaying a list of menu items 320-330 in the interface 310. The individual items may represent applications or other UI objects. A user may scroll left or right (as seen from the user's point of view) through the list 310 to view other menu items not in the current display but also associated with the list, select menu items to trigger an action such as opening an application represented by the menu item or further UI controls for that item. The user may also move backwards through the UI to a higher level menu item in the UI hierarchy.

The system may include gesture recognition, so that a user may control an application or operating system executing on the computing environment 12, which as discussed above may be a game console, a computer, or the like, by performing one or more gestures. In one embodiment, a gesture recognizer engine, the architecture of which is described more fully below, is used to determine from a skeletal model of a user when a particular gesture has been made by the user.

Generally, as indicated in FIGS. 1 and 2, a user 18 is confined to a physical space 100 when using a capture device 20. The physically limited space 100 is generally the best performing range of the capture device 20.

In FIGS. 1-2, the user performs a right-handed gesture to scroll the list of menu items to the left as seen from the user's point of view. The user begins with his right hand in position 304 as shown in FIG. 1, then moves it to position 306 toward the left side of his body. The list 310 of menu items 320-328 is in a first position in FIG. 1 when the user begins the gesture with his hand at position 304. In FIG. 2, the user has moved his hand to position 306, causing the list of menu items to change by scrolling the list 310 of menu items to the left. Menu item 320 has been removed from the list as a result of scrolling to the left (as defined in user's 18 point of view). Each of items 322-328 has moved one place to the left, replacing the position of the immediately preceding item. Item 330 has been added to the list, as a result of scrolling from the right to the left.

FIG. 2 illustrates one embodiment of a capture device 20 and computing system 12 that may be used in the target recognition, analysis and tracking system 10 to recognize human and non-human targets in a capture area of limited space 100 (without special sensing devices attached to the subjects), uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing environment 12 in the target recognition, analysis and tracking system 10. Additionally, the microphone 40 may be used to receive audio signals that may also be provided by the user to control applications such as game applications, non-game applications, or the like that may be executed by the computing environment 12.

In one embodiment the microphone 40 comprises array of microphone with multiple elements, for example four elements. The multiple elements of the microphone can be used in conjunction with beam forming techniques to achieve spatial selectivity In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

Processor 42 may include an imaging signal processor capable of adjusting color, brightness, hue, sharpening, and other elements of the captured digital image.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing environment 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46.

The capture device 20 may provide the depth information and images captured by, for example, the 3-D camera 36 and/or the RGB camera 38, including a skeletal model that may be generated by the capture device 20, to the computing environment 12 via the communication link 46. The computing environment 12 may then use the skeletal model, depth information, and captured images to, for example, create a virtual screen, adapt the user interface and control an application such as a game or word processor.

A motion tracking system 191 uses the skeletal model and the depth information to provide a control output to an application on a processing device to which the capture device 20 is coupled. The depth information may likewise be used by a gestures library 192, structure data 198, gesture recognition engine 190, depth image processing and object reporting module 194 and operating system 196. Depth image processing and object reporting module 194 uses the depth images to track motion of objects, such as the user and other objects. The depth image processing and object reporting module 194 will report to operating system 196 an identification of each object detected and the location of the object for each frame. Operating system 196 will use that information to update the position or movement of an avatar or other images in the display or to perform an action on the provided user-interface. To assist in the tracking of the objects, depth image processing and object reporting module 194 uses gestures library 192, structure data 198 and gesture recognition engine 190.

Structure data 198 includes structural information about objects that may be tracked. For example, a skeletal model of a human may be stored to help understand movements of the user and recognize body parts. Structural information about inanimate objects may also be stored to help recognize those objects and help understand movement.

Gestures library 192 may include a collection of gesture filters, each comprising information concerning a gesture that may be performed by the skeletal model (as the user moves). A gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Those gestures may be associated with various controls of an application. Thus, the computing system 12 may use the gestures library 192 to interpret movements of the skeletal model and to control operating system 196 or an application (not shown) based on the movements.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

A communication application 300 may operate on the computing system 12 to allow users to communicate via capture devices and communication systems which communicate with each other over a network 50 (illustrated and discussed below with respect to FIG. 8). Communication application 300 may be any commercially available communication application, instant messenger application, or audio/visual conferencing application. One example of one such application is Skype® by Skype Communication SARL.

Figure 3:
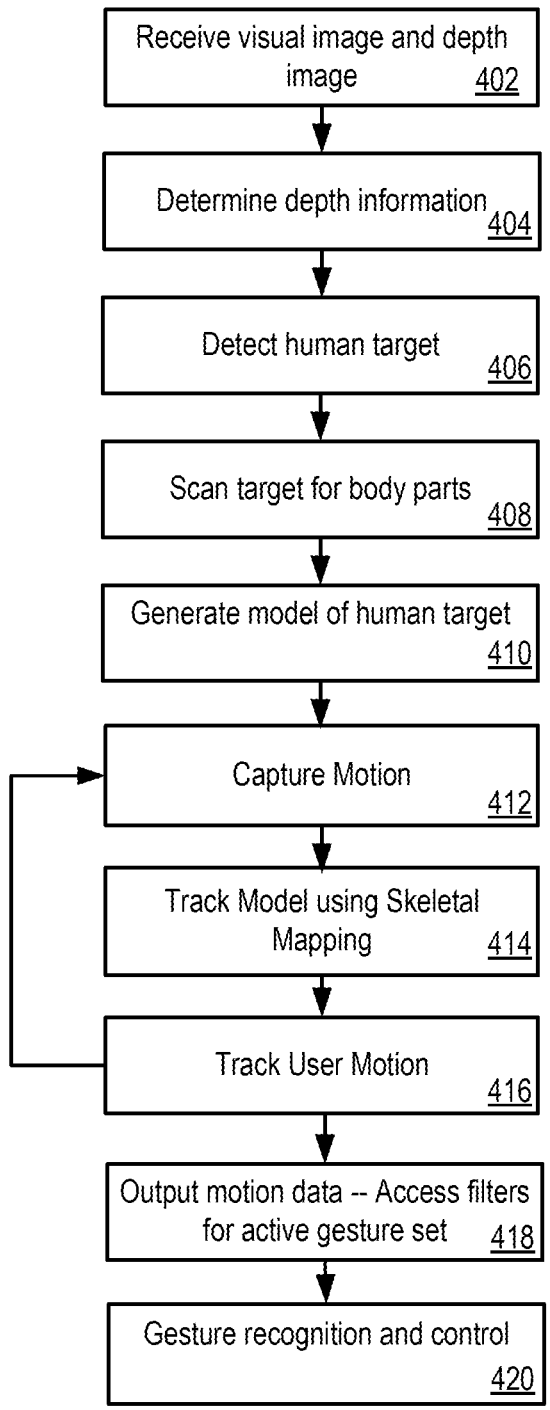
FIG. 3 is a flowchart describing one embodiment of a process for tracking user motion.

FIG. 3 is a flowchart describing one embodiment of a process for gesture control of a user interface as can be performed by tracking system 10 in one embodiment. At step 402, processor 42 of the capture device 20 receives a visual image and depth image from the image capture component 32. In other examples, only a depth image is received at step 402. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times. In other embodiments the depth image is captured with the visual image or combined with the visual image as one image file so that each pixel has an R value, a G value, a B value and a Z value (representing distance).

At step 404 depth information corresponding to the visual image and depth image are determined. The visual image and depth image received at step 402 can be analyzed to determine depth values for one or more targets within the image. Capture device 20 may capture or observe a capture area that may include one or more targets. At step 406, the capture device determines whether the depth image includes a human target. In one example, each target in the depth image may be flood filled and compared to a pattern to determine whether the depth image includes a human target. In one example, the edges of each target in the captured scene of the depth image may be determined. The depth image may include a two dimensional pixel area of the captured scene for which each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a predetermined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or a physical object in the capture area.

At step 408, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements. At step 410 a model of the human target is generated based on the scan performed at step 408. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders. Thus, in one embodiment, a stored value may be added to the X value associated with the top of the head to determine the X value associated with the shoulders.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurement values in the data structure more closely correspond to a typical model of a human body. Measurement values determined by the scanned bitmask may be used to define one or more joints in a skeletal model at step 410.

At step 412, motion is captured from the depth images and visual images received from the capture device. In one embodiment capturing motion at step 414 includes generating a motion capture file based on the skeletal mapping as will be described in more detail hereinafter. At 414, the model created in step 410 is tracked using skeletal mapping and to track user motion at 416. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space.

At step 416 user motion is tracked. At step 418 motion data is provided to an application, such as a navigation system as described herein. Such motion data may further be evaluated to determine whether a user is performing a pre-defined gesture. Step 418 can be performed based on the UI context or contexts determined in step 416. For example, a first set of gestures may be active when operating in a menu context while a different set of gestures may be active while operating in a game play context. Step 418 can also include determining an active set of gestures. At step 420 gesture recognition and control is performed. The tracking model and captured motion are passed through the filters for the active gesture set to determine whether any active gesture filters are satisfied. Any detected gestures are applied within the computing environment to control the user interface provided by computing environment 12. Step 420 can further include determining whether any gestures are present and if so, modifying the user-interface action that is performed in response to gesture detection.

In one embodiment, steps 416-420 are performed by computing device 12. Furthermore, although steps 402-414 are described as being performed by capture device 20, various ones of these steps may be performed by other components, such as by computing environment 12. For example, the capture device 20 may provide the visual and/or depth images to the computing environment 12 which will in turn, determine depth information, detect the human target, scan the target, generate and track the model and capture motion of the human target.

Figure 4:
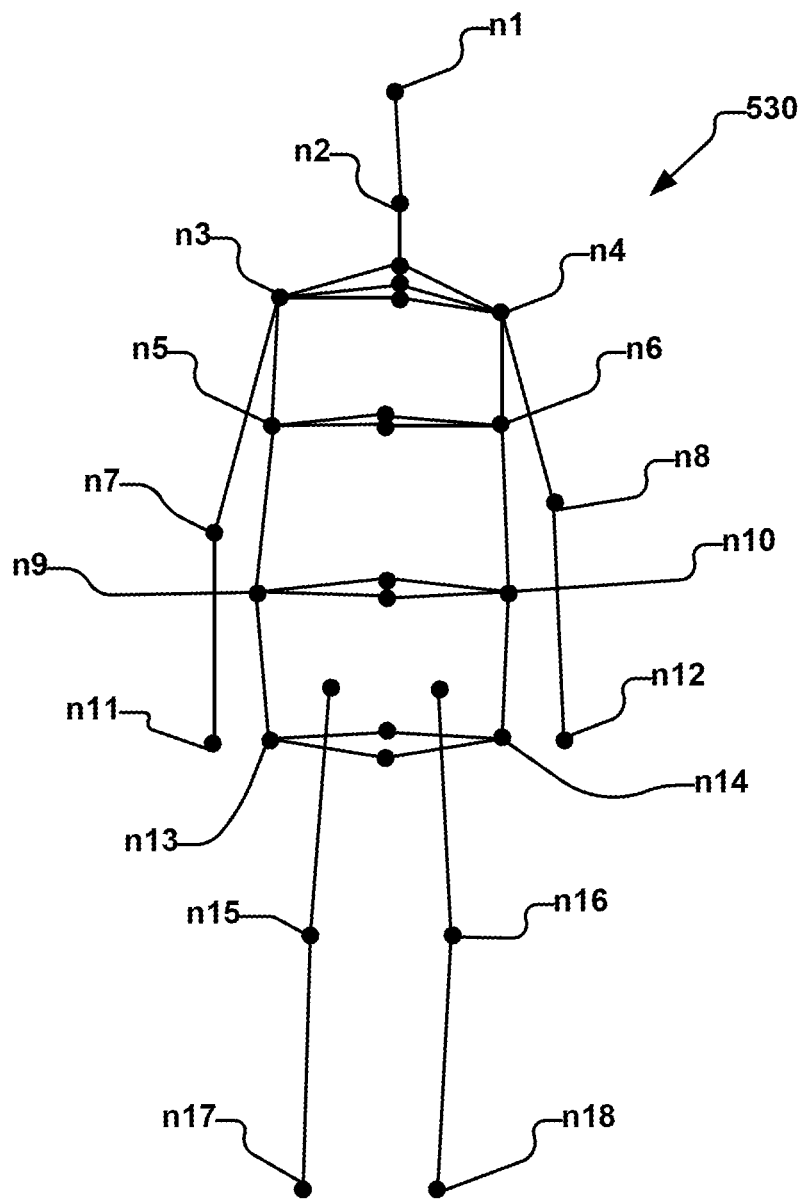
FIG. 4 is an example of a skeletal model of a human target that can be generated by a tracking system in one embodiment.

FIG. 4 illustrates an example of a skeletal model or mapping 530 representing a scanned human target that may be generated at step 410 of FIG. 3. According to one embodiment, the skeletal model 530 may include one or more data structures that may represent a human target as a three-dimensional model. Each body part may be characterized as a mathematical vector defining joints and bones of the skeletal model 530.

Skeletal model 530 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 5:
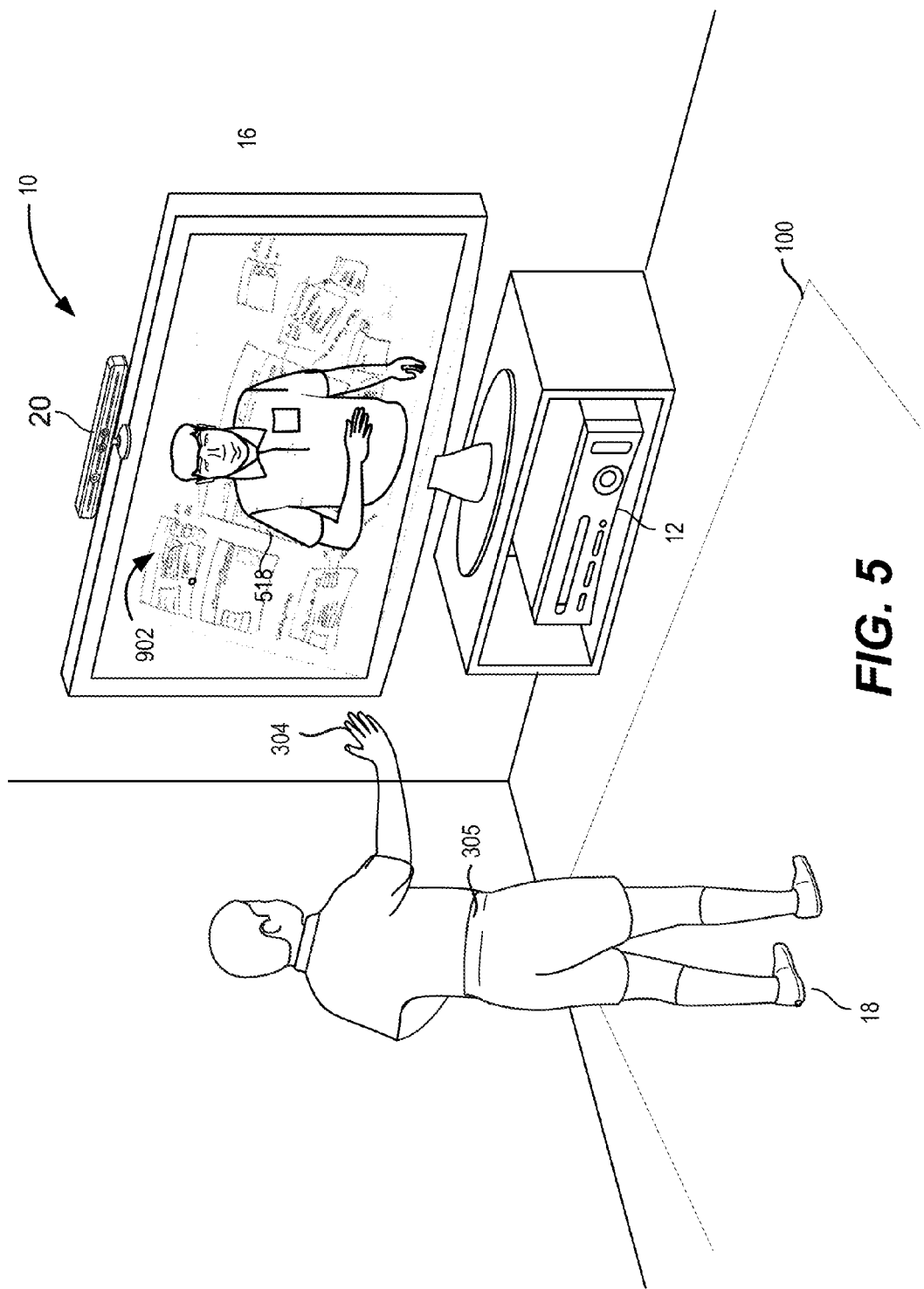
FIG. 5 is a representation of a local user participating in an audio/visual conference with a remote user.
Figure 6:
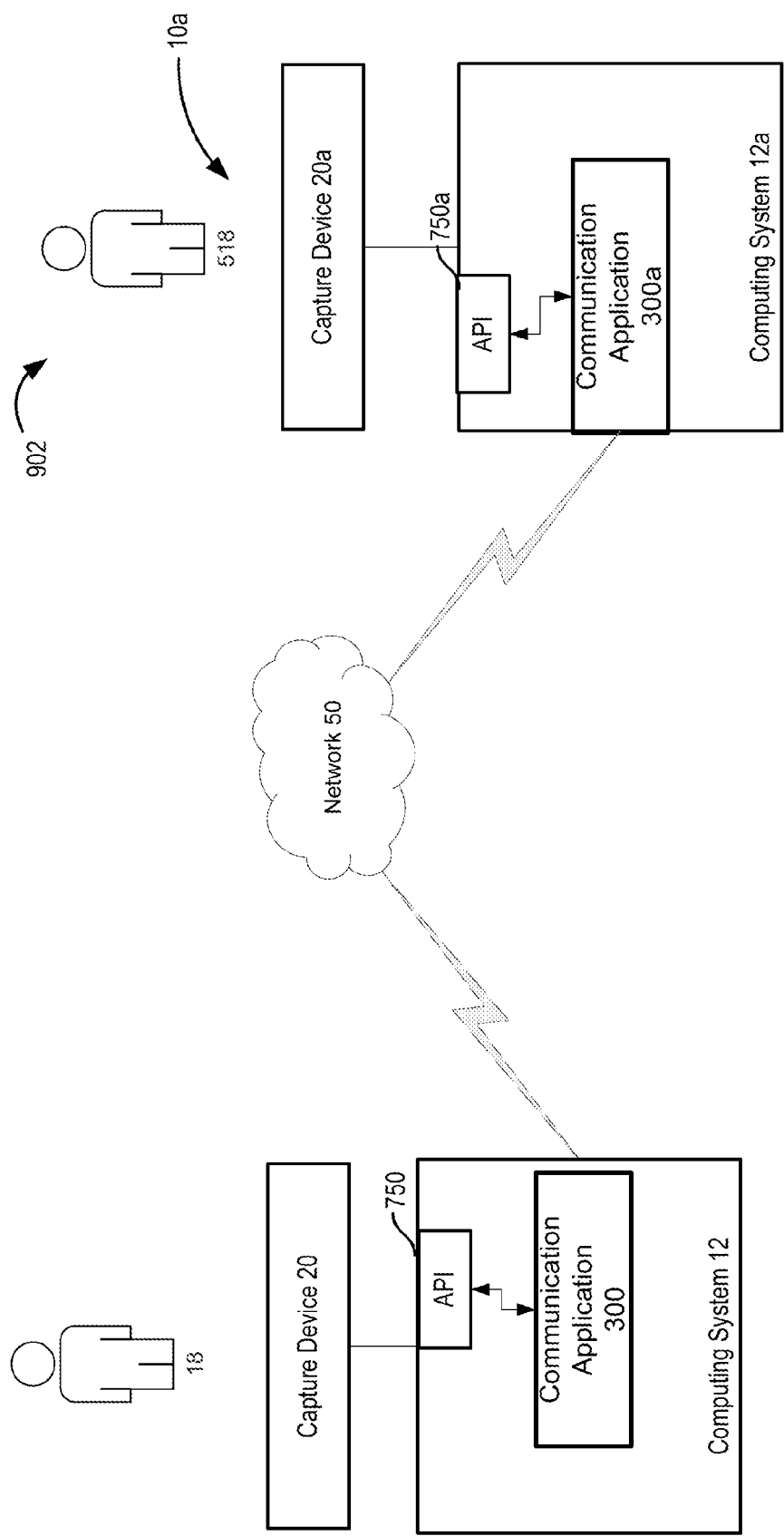
FIG. 6 is a representation of two users participating in a conference via a network

FIG. 5 is a depiction of an audiovisual conference between a local user 18 and a remote user 518. With reference to FIG. 5 and FIG. 6, a remote user 518 is present at a remote location 902 and may have, at the location, a system 10A equivalent to system 10 with a remote capture device such as capture device 20a and remote display (not shown) such as display 16, and a remote processing device 12a equivalent to processing device 12. It should be understood that the local and remote systems 10,10a need not be identical, but merely functionally equivalent. In one embodiment, moreover, only one system need include a capture device or utilize gesture controls. Through the user of the capture device and processing devices, each user sees a projection of the other user on their respective display. In FIG. 5, user 18 sees and interacts with a projection of user 518 on display 16.

In one alternative, both local user 18 and remote user 518 can make gestures, sounds, and otherwise operate respective local system 10 and remote system 10a in a similar manner 18. User 18 can make communicate by speaking, gesturing and moving, all of which are captured and transmitted by local capture device 20 and to the remote location 902 and displayed to user 518 at the remote location. As illustrated in FIG. 6, local computing system 12 is coupled to a remote computing system 12 via network 50. Each capture device 20 may be coupled to the communication application 300, described above and computing system 12 includes an application programming interface (API) 750 which may be accessed by the communication application to control aspects of the computing system or the capture device in a manner defined by both the application and the application programming interface.

As illustrated in FIG. 5, when users participate in an audio/visual conference, there may be background audio or visual noise which is captured by each capture device. This noise can be distracting to the conference. This background information can take many forms, including background audio noise, and background visual noise. In addition, other remote users or objects may be present which may or may not be of interest to user 18. Similarly, there may be instances in the conference when it is desirable to focus or enhance the audio or video in a particular area of a remote location.

In accordance with the present technology, a local user 18 can use gesture controls to manipulate presentation of the remote location on local display 16, allowing the local user a natural degree of control of the audiovisual conference using gesture based controls.

Figure 7A:
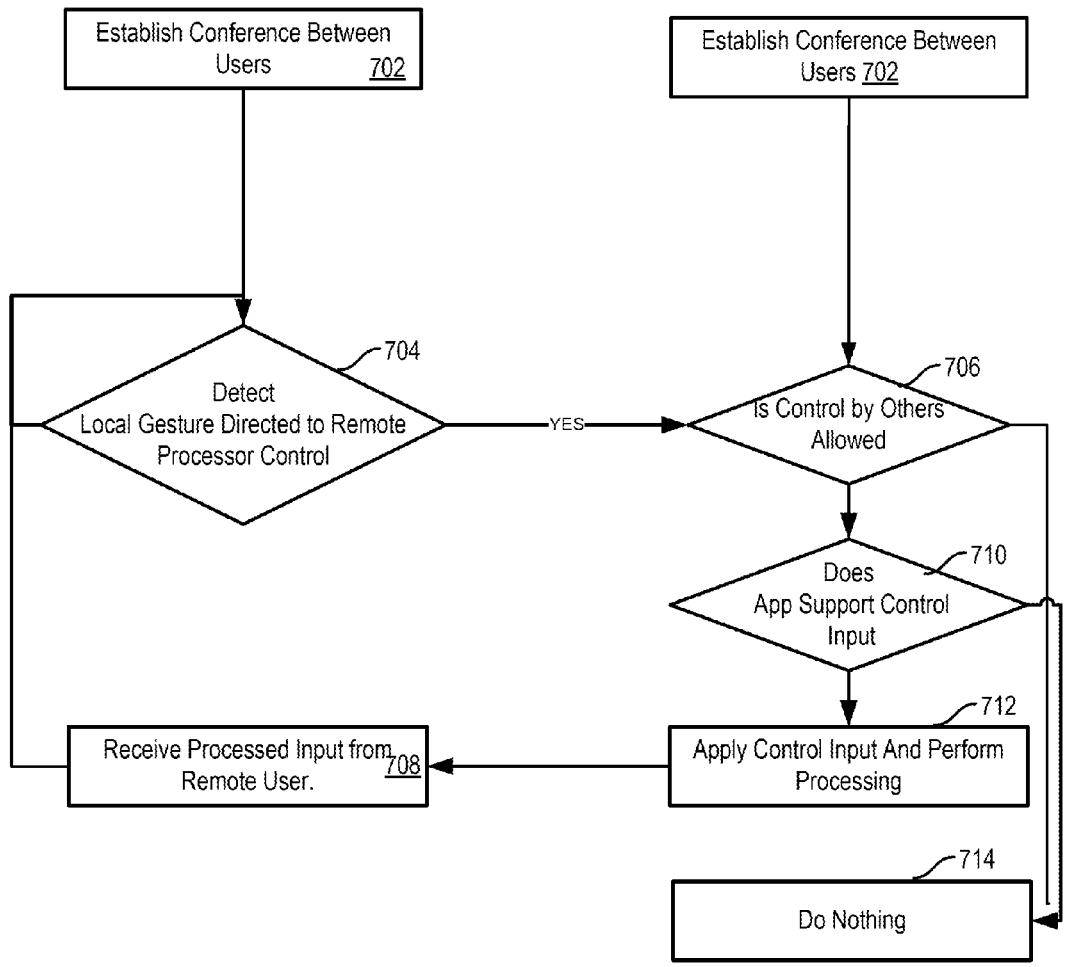
FIG. 7A is a flowchart illustrating one method in accordance with the present technology.

FIG. 7A is a method illustrating one aspect of the present technology. The left side of FIG. 7A illustrates portions of the process occurring at the local system, while the right side of the flowchart illustrates steps occurring at the remote system. It should be understood that the local system and the remote system are interchangeable in accordance with the present technology. At 702, a conference is established between a remote user and a local user. That is, both the local and remote system can operate steps 702 through 714. At 704, the local system will detect whether a local gesture is directed to control an aspect of remote processing. As illustrated below, the gesture can control audio processing, visual processing, or both. If a gesture is detected, a control signal may be created for transmission to the remote processing system, with the control signal designed to manipulate the audio or visual processing at the remote location. At 706, a determination is made by the remote system as to whether or not control by others is allowed. If not, no action is taken. If control is allowed, then a determination is made at step 710 whether the communications application executing on the remote processing system allow or support the control input requested. Again, if this not supported, no action is performed. If the control is supported and allowed, then the control input is applied at 712 and processing at the remote location is altered in accordance with the instructions in control input from the local system. At 712, the output of the remote system is returned to the local system where it is rendered in the local display. When the signal is returned to the local location, the process input from the remote user at 708 is altered in the local display.

Figure 7B:
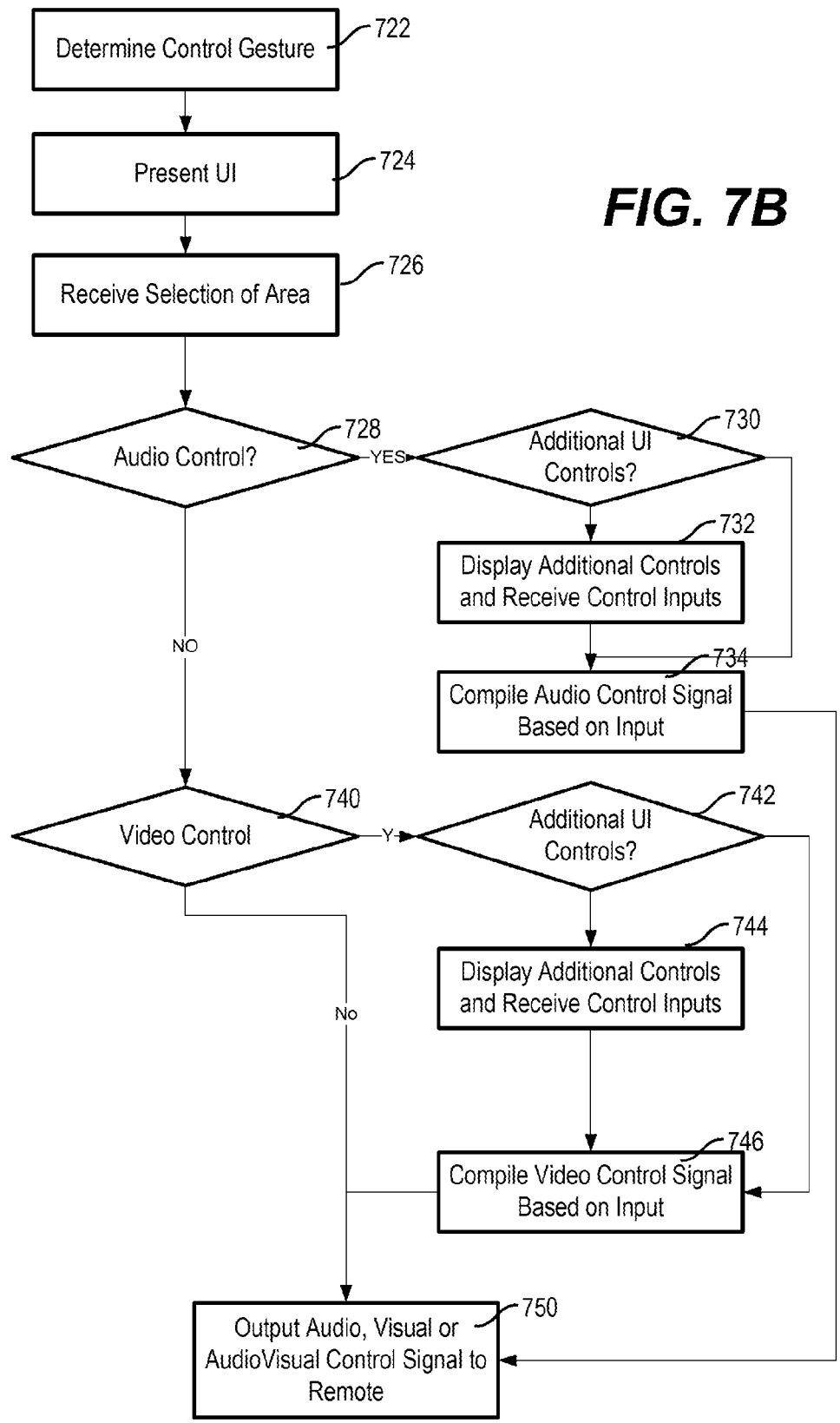
FIG. 7B is a flowchart illustrating another method in accordance with the present technology.
Figure 8:
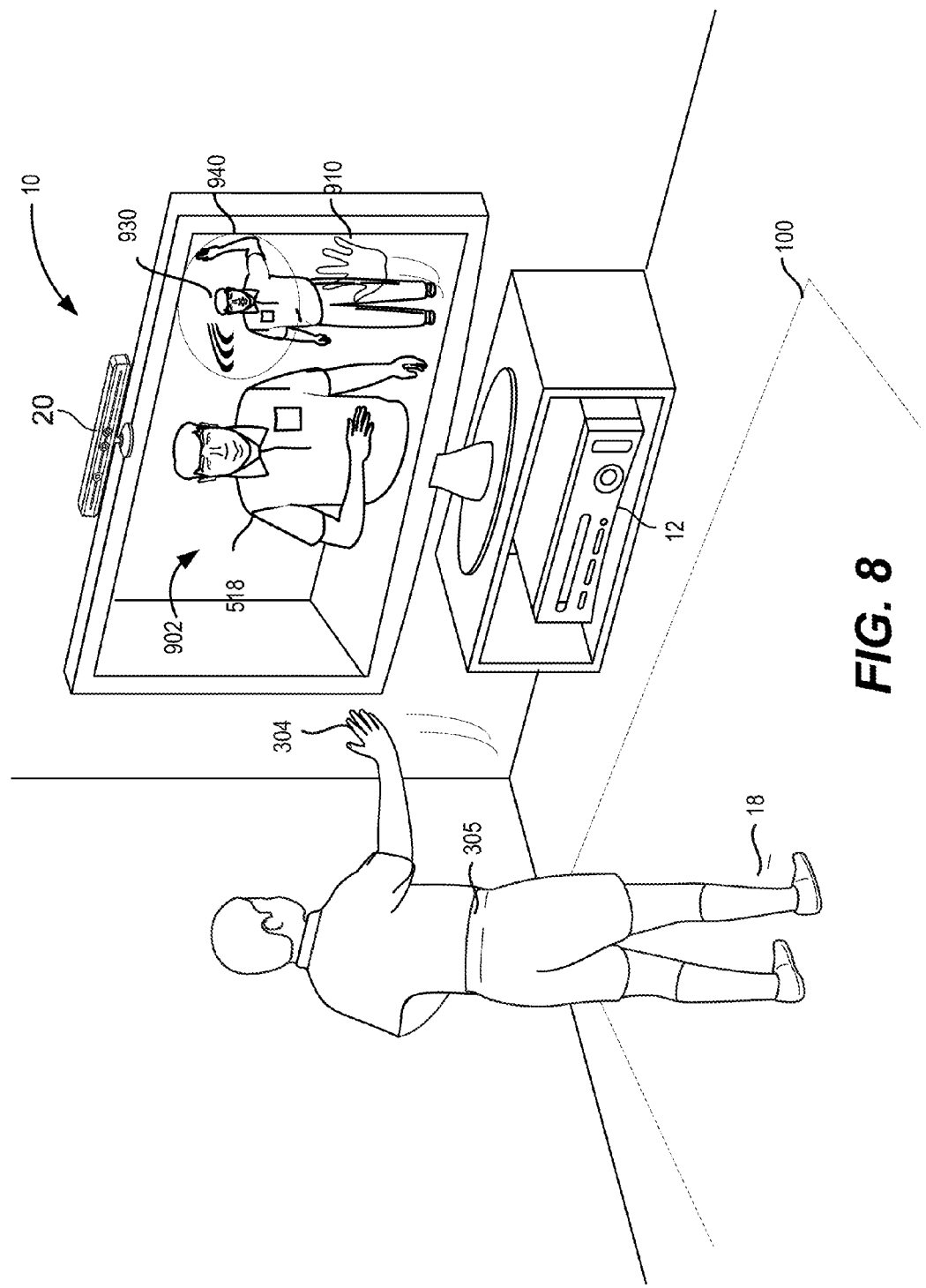
FIGS. 8-10 are representations of a user in a video conference using gestures to control audio at a remote location to change a representation at the local display.

FIG. 8 illustrates a perspective of a local user participating in an audio/visual conference with a remote user 518. In FIG. 7, a gesture is utilized by a local user 18 relative to the display of a remote user 518 to control aspects of the audio/visual conference. At the remote location 902, a first user 518 and a second user 930 are both present. In this example, consider that the local user 18 is interested only in interacting with the remote user 518, and remote user 930 is a distraction.

With reference to FIG. 7B and FIGS. 8-10, gesture based user interaction with a local system during an audio/visual conference with a remote user is illustrated. FIG. 7B is a flow chart of detection of a local gesture and interaction with the video conferencing technology. FIG. 7B may comprise one representation of one embodiment of step 704 in FIG. 7A.

Figure 9:
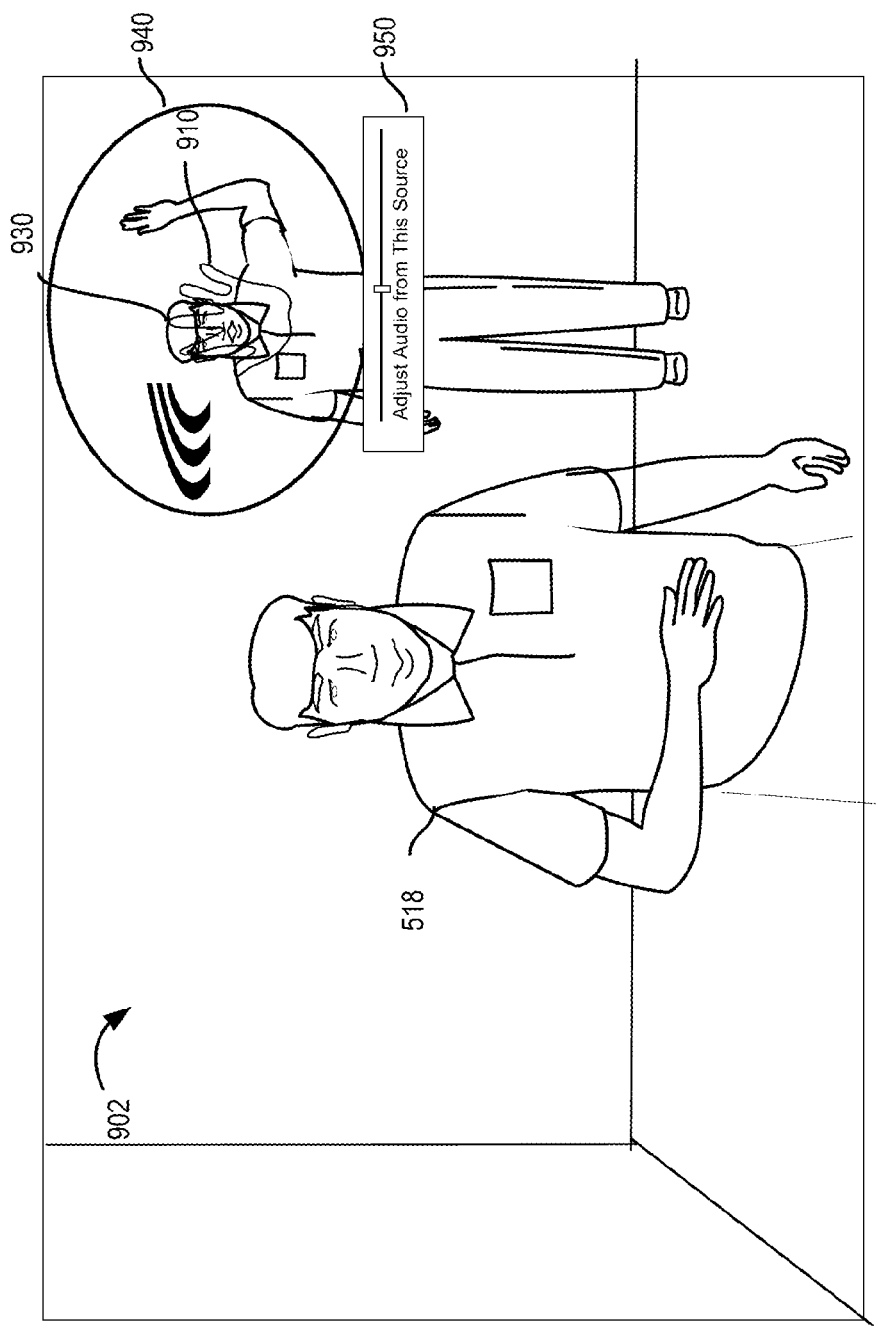

In FIG. 8, a local user initiate a gesture by, for example, raising the arm as indicated at 304 which will, in turn, generate a user interface to allow for control of the representation of the remote location 902 on the display 16. In this case, as illustrated in FIG. 8, user interface includes a selector 910 (a hand icon) which tracks the motion of the hand of user 18 when the hand is moved relative to the display 16, and when positioned over region 940 and, for example, held steady, could be used to select region 940 by the local user. The region 940 is merely illustrative, and selection may be of a larger or smaller region, or may be of the remote user 930 as a region. Once a region is selected, the act of selecting the region may have a default action associated with it—for example, mute audio in this region—or one or more additional gestures and/or user interaction elements can be used to achieve processing desired by user 18. Illustrated in FIG. 9 is an alternative volume slider which may appear once region 940 is selected and allow the local user to adjust the audio output of user 930. The volume slider may, for example, allow the user to reduce the volume coming from this region. It should be recognized that nay number of simple or advanced audio or visual controls may be utilized in this embodiment.

With reference to FIG. 7B, when a user 18 performs a gesture, at step 722, a determination is made that a control gesture has been initiated by a user. At step 724, a user interface may be presented. User interface may be very basic or may be more complex as illustrated in the below figures. As noted above, in some embodiments, the user interface may be as basic as indicating where on the display a selection is being made. A basic user interface allows a selection icon such as the selector 910 illustrated in FIGS. 8 and 9 to be presented on a display 16. This gives the user an idea of the relative position of the user's hand motion being made. At step 726, a selection of a particular area of the display is received. The area may be the selection of a specific user, or a region on the screen. Selection may occur by holding a user's hand steady over an area, or by using another selection specific gesture. Selection may likewise be made of a region having some relationship to objects detected in the remote location. For example, the remote system may have determined and indicated that the user 930 is a human and can be selected as an object itself.

Figure 10:
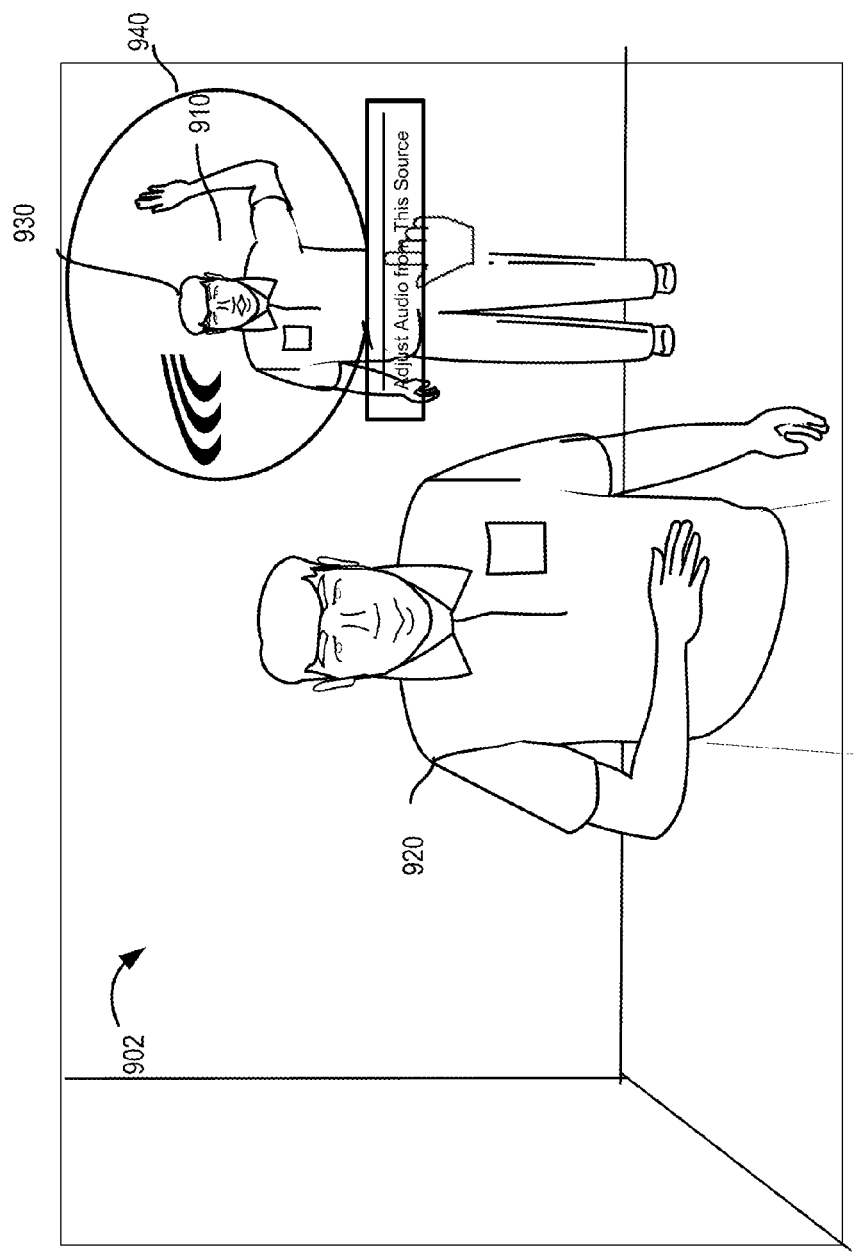

In the example illustrated in FIG. 8, a region 940 is selected based on a determination that an audio source or user 940 is present within this region. In FIG. 8, the user has selected the region 940 and, for example, held his hand in place as illustrated in FIG. 9 At step 728, a determination is made as to whether or not a user has made a gesture which indicates an audio control is desired. An audio control may be represented by any number of gestures, including a user's hand up flat, wiping the hand across a selected region, or any of a number of other types of gestures. If an audio control is selected, a determination is made as to whether or not additional user interface controls should be presented to the user at step 730. Additional user interface controls may be, for example, the volume slider 950 such as that illustrated in FIGS. 9 and 10. Options may be provided to the user to allow the user to select additional interface controls. In FIGS. 9 and 10, an audio slider 950 is presented just below region 940 to allow user 18 to change the audio output being received from this particular area of the display in the remote location. A user may "grasp" the slider or push the slider using a gesture to control the hand icon, which has changed shape as illustrated in FIG. 10

Returning to FIG. 7B, at step 732, if additional controls are required, they are displayed to allow the user to provide control inputs. After control inputs are received at step 732, or if no additional user interface controls were required at 730, then an audio control signal based on the input from the local user is compiled at 734. If no audio control signal is necessary or in addition to the compilation of the audio control portion of the signal at 734, then at 740 a determination is made as to whether a video control gesture has been made. If no video control gesture has been made, then at 750, an output is made of the audio only portion of the control signal. If a video control gesture has been made at 740, then at 742, a determination is made as to whether additional video controls are required.

Figure 11:
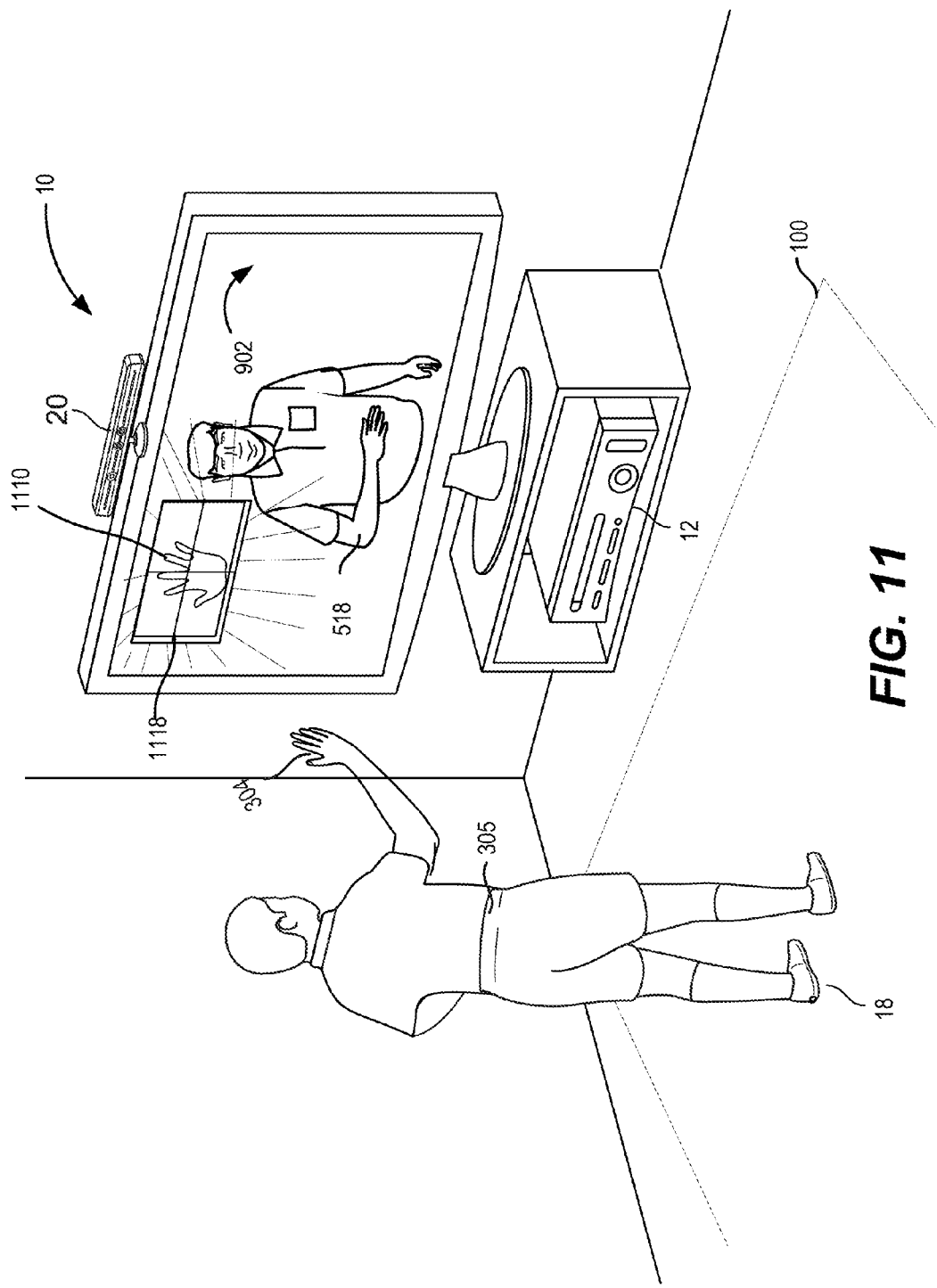
FIG. 11-12 are representations of a user in a video conference using gestures to control video at a remote location to change a representation at the local display.
Figure 12:
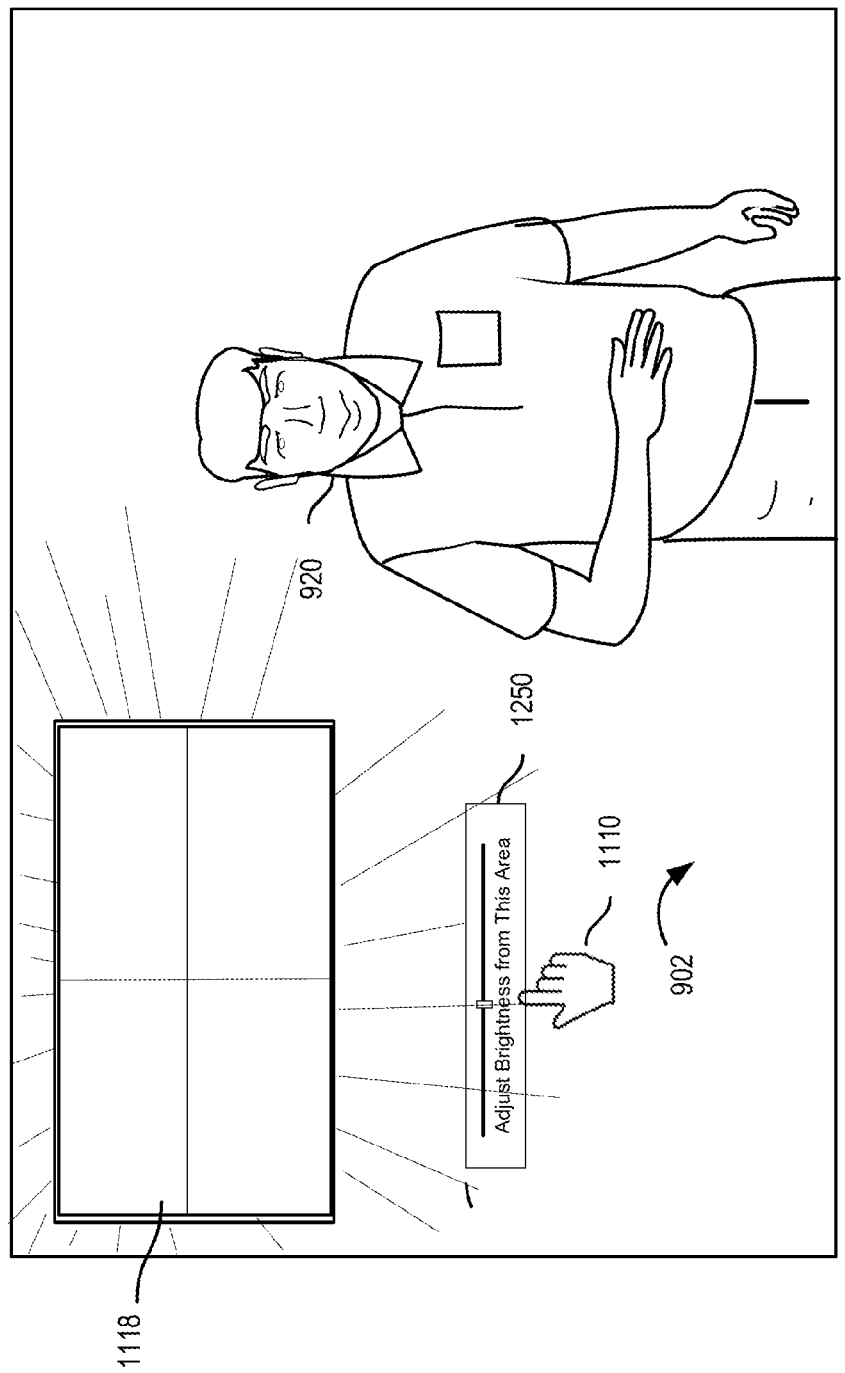

FIGS. 11 and 12 illustrate user selection and control of video at a remote location. In FIG. 11, the remote location 902 has a window 1118 which is exceedingly bright (1118) and backlights the remote user 518. This can make viewing user 518 uncomfortable for user 18. By motioning at 304 and holding icon 110 window 1118, the user may attempting reduce the brightness of a backlit user at a remote location 902. As illustrated in FIG. 12, selecting the window region 1118 in FIG. 11 allows the user to reduce the brightness when an additional video control 1250 is displayed in, for example, an area under window 1118.

Returning to FIG. 7B, once a video control gesture is determined at 740, the determination is made at 742 as to whether or not additional video interface controls are desired at 742. If the additional video controls are required at 742, then additional controls are displayed at 744 and additional control inputs for the video portion of the control are received at 744. At 746, the control video signal is compiled based on the input. If both audio and visual signals have been acquired, then at 750, a composite control signal is output to the remote device. As illustrated in FIGS. 11 and 12, the gesture which controls the screen output available to the user for video control may be similar to that illustrated above with respect to audio controls. It should be understood that any number of different types of gestures may be provided. It should also be understood that any different types of controls may be utilized to alter the video signal being transmitted from the remote location to the local location. Dials, sliders, abstract gestures or gestures mimicking interactions with the representation of the remote location on the display may all be user.

As noted above, at steps 706 and 710, permissions may be set by the user or, for example, control application 300 to determine whether control requests received from a remote user are allowed to alter local processing for the remote user.

In accordance with the present technology, the control signal alters the processing output by the process 42, memory 44 and competing system 12 at the remote location. This minimizes the amount of information which is transmitted from the remote location to the local location to be rendered on device 16. Because processing takes place at the remote location, and because the actions of the user at the local location are gesture based, a natural user interface is provided which allows an improved video conferencing solution using natural user interface controls. It should be further understood that the type of controls which may be provided by the audio system include enhancing the audio input from a particular region of the remote location using the directional array microphone, blocking sounds from a particular area, or, more complicated digital signal processing techniques to enhance the sound coming from particular regions or block sounds coming from particular regions of the remote display. It should be further understood that although only one particular region is illustrated in the figures, multiple regions of the remote display can be controlled. In addition, it should be understood that for video processing, any number of different types of video processing can occur including, for example, adjusting the pan, tilt, zoom, game, resolution, frame rate, or other video controls.

Still further, although basic controls are illustrated in the figures, more advanced controls can be provided.

Figure 13:
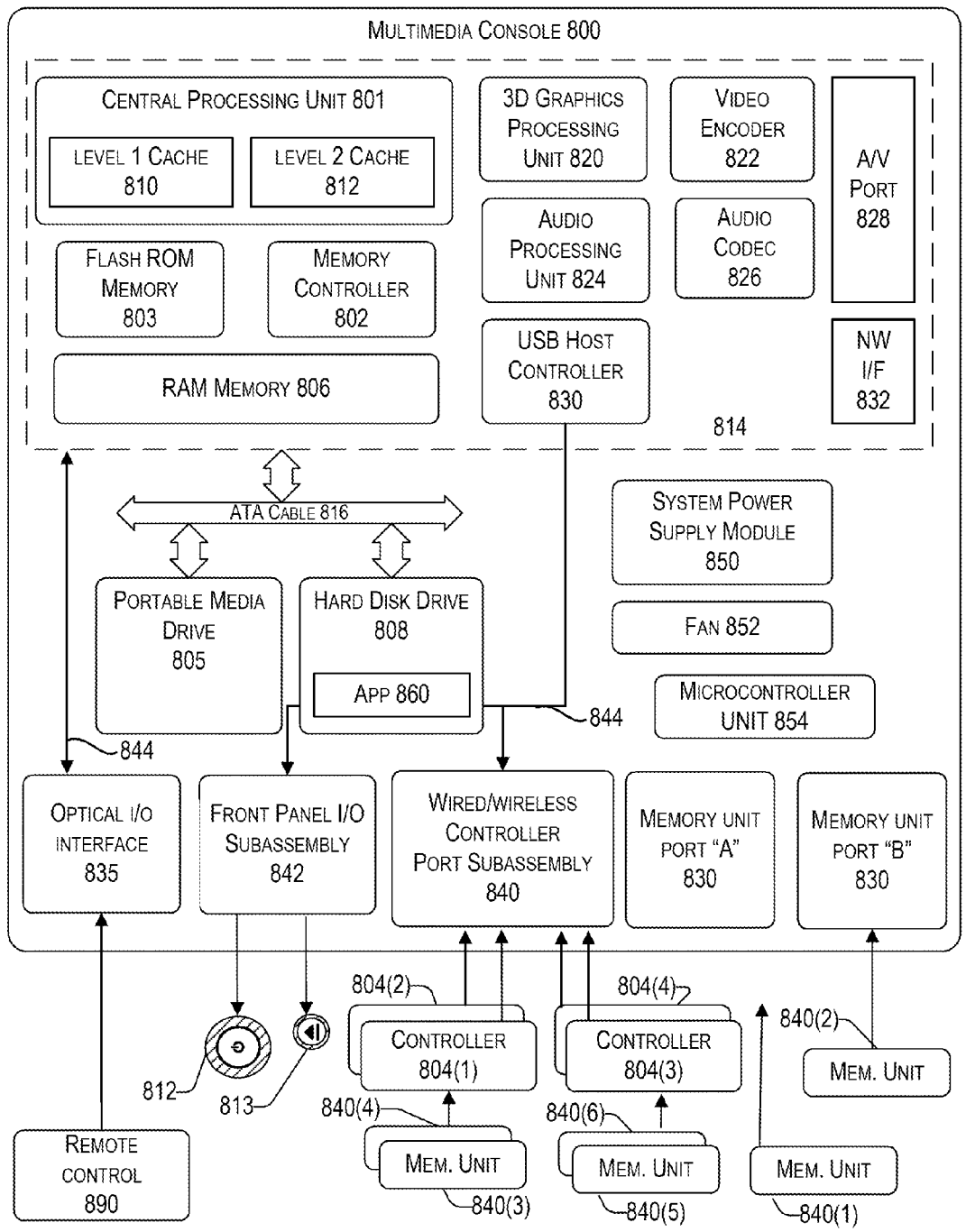
FIG. 13 is a block diagram of a first processing device

FIG. 13 is a block diagram of one embodiment of a computing system that can be used to implement a hub computing system 12 like that of FIG. 1. In this embodiment, the computing system is a multimedia console 800, such as a gaming console. As shown in FIG. 13, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an NV (audio/video) port 828 for transmission to a television or other display. In the illustrated implementation, video and audio processing components 820-828 are mounted on module 214.

FIG. 13 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 21 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming console 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media console 800 may be operated as a standalone system by simply connecting the system to monitor 16 (FIG. 1A), a television, a video projector, or other display device. In this standalone mode, gaming and media console 800 enables one or more players to play games, or enjoy digital media, e.g., by watching movies, or listening to music. However, with the integration of broadband connectivity made available through network interface 832, gaming and media console 800 may further be operated as a participant in a larger network gaming community.

Figure 14:
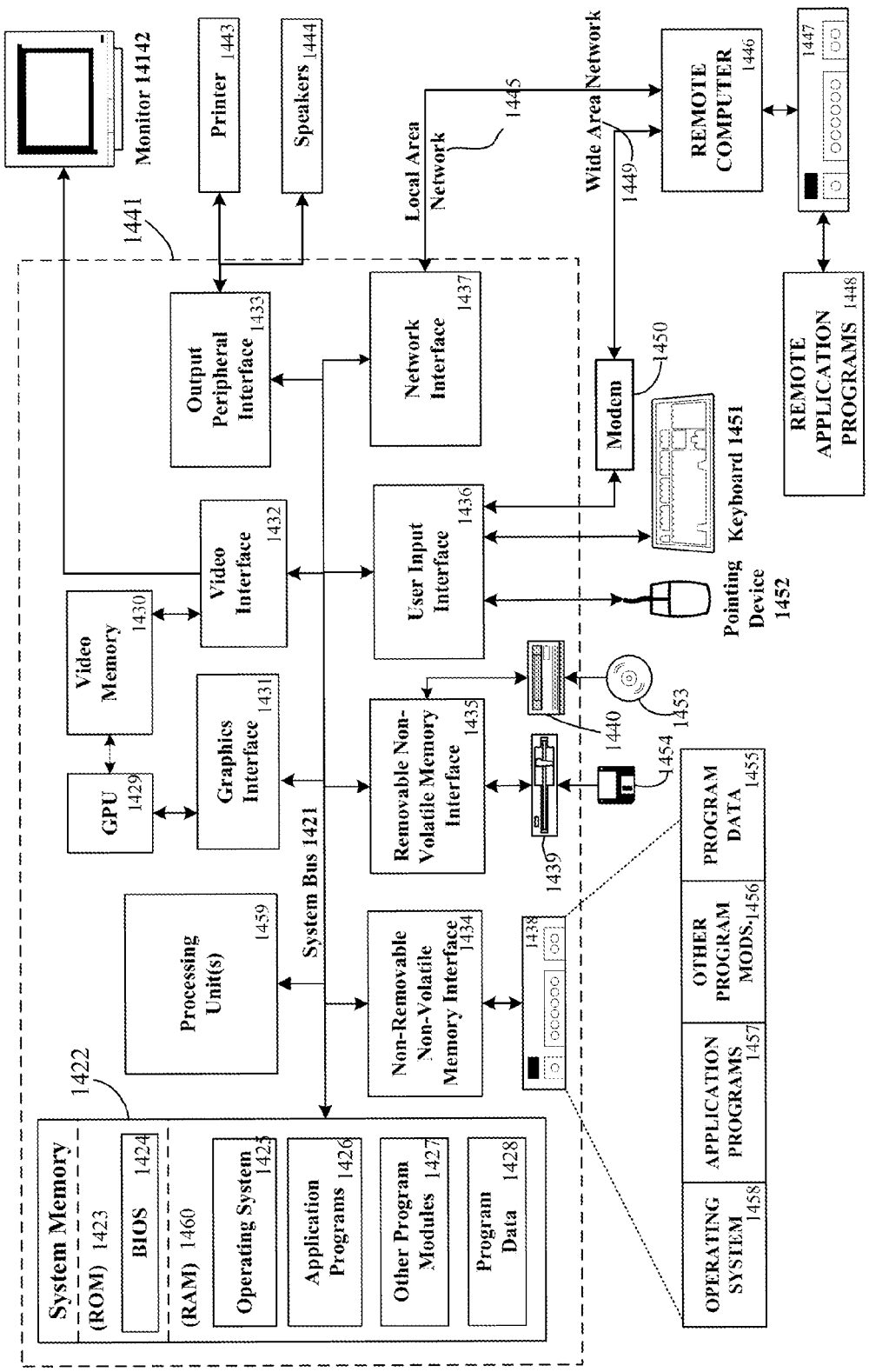
FIG. 14 is a block diagram of a second processing device.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein FIG. 14 illustrates another example embodiment of a computing system 1420 that may be the computing system 112 shown in FIGS. 1A-2B used to track motion and/or animate (or otherwise update) an avatar or other on-screen object displayed by an application. The computing system 1420 is only one example of a suitable computing system and is not intended to suggest any limitation as to the scope of use or functionality of the presently disclosed subject matter. Neither should the computing system 1420 be interpreted as having any dependency or requirement relating to any one or combination of components illustrated in the exemplary operating system 1420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 1420 comprises a computer 1441, which typically includes a variety of computer readable media. Computer readable media can be any available media that can be accessed by computer 1441 and includes both volatile and nonvolatile media, removable and non-removable media. The system memory 1422 includes computer storage media in the form of volatile and/or nonvolatile memory such as read only memory (ROM) 1423 and random access memory (RAM) 1460. A basic input/output system 1424 (BIOS), containing the basic routines that help to transfer information between elements within computer 1441, such as during start-up, is typically stored in ROM 1423. RAM 1460 typically contains data and/or program modules that are immediately accessible to and/or presently being operated on by processing unit 1459. By way of example, and not limitation, FIG. 14 illustrates operating system 1425, application programs 1426, other program modules 1427, and program data 1428.

The computer 1441 may also include other removable/non-removable, volatile/nonvolatile computer storage media. By way of example only, FIG. 14 illustrates a hard disk drive 1438 that reads from or writes to non-removable, nonvolatile magnetic media, a magnetic disk drive 1439 that reads from or writes to a removable, nonvolatile magnetic disk 1454, and an optical disk drive 1440 that reads from or writes to a removable, nonvolatile optical disk 1453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1438 is typically connected to the system bus 1421 through an non-removable memory interface such as interface 1434, and magnetic disk drive 1439 and optical disk drive 1440 are typically connected to the system bus 1421 by a removable memory interface, such as interface 1435.

The drives and their associated computer storage media discussed above and illustrated in FIG. 14, provide storage of computer readable instructions, data structures, program modules and other data for the computer 1441. In FIG. 14, for example, hard disk drive 1438 is illustrated as storing operating system 1458, application programs 1457, other program modules 1456, and program data 1455. Note that these components can either be the same as or different from operating system 1425, application programs 1426, other program modules 1427, and program data 1428. Operating system 1458, application programs 1457, other program modules 1456, and program data 1455 are given different numbers here to illustrate that, at a minimum, they are different copies. A user may enter commands and information into the computer 1441 through input devices such as a keyboard 1451 and pointing device 1452, commonly referred to as a mouse, trackball or touch pad. Other input devices (not shown) may include a microphone, joystick, game pad, satellite dish, scanner, or the like. These and other input devices are often connected to the processing unit 1459 through a user input interface 1436 that is coupled to the system bus, but may be connected by other interface and bus structures, such as a parallel port, game port or a universal serial bus (USB). The cameras 226, 228 and capture device 120 may define additional input devices for the computing system 1420 that connect via user input interface 1436. A monitor 1442 or other type of display device is also connected to the system bus 1421 via an interface, such as a video interface 1432. In addition to the monitor, computers may also include other peripheral output devices such as speakers 1444 and printer 1443, which may be connected through a output peripheral interface 1433. Capture Device 120 may connect to computing system 1420 via output peripheral interface 1433, network interface 1437, or other interface.

The computer 1441 may operate in a networked environment using logical connections to one or more remote computers, such as a remote computer 1446. The remote computer 1446 may be a personal computer, a server, a router, a network PC, a peer device or other common network node, and typically includes many or all of the elements described above relative to the computer 1441, although only a memory storage device 1447 has been illustrated in FIG. 14. The logical connections depicted include a local area network (LAN) 1445 and a wide area network (WAN) 1449, but may also include other networks. Such networking environments are commonplace in offices, enterprise-wide computer networks, intranets and the Internet.

When used in a LAN networking environment, the computer 1441 is connected to the LAN 1445 through a network interface or adapter 1437. When used in a WAN networking environment, the computer 1441 typically includes a modem 1450 or other means for establishing communications over the WAN 1449, such as the Internet. The modem 1450, which may be internal or external, may be connected to the system bus 1421 via the user input interface 1436, or other appropriate mechanism. In a networked environment, program modules depicted relative to the computer 1441, or portions thereof, may be stored in the remote memory storage device. By way of example, and not limitation, FIG. 14 illustrates application programs 1448 as residing on memory device 1447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect motion of a user or other user behaviors. However, while useful for detecting certain types of user behaviors, ST techniques have proven to be unreliable for detecting other types of user behavior. For example, ST techniques are typically unreliable for detecting user behaviors where the user is laying or sitting on or near the floor. Certain embodiments described herein rely on depth images to detect user behaviors. Such user behaviors detected based on depth base images can be used in place of, or to supplement, ST techniques for detecting user behaviors. Accordingly, before discussing such embodiments in additional detail, it would first be useful to provide additional details of depth images.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing a video conference between a local location and a remote location, the method comprising:
receiving at the local location, video and audio signal obtained from a remote capture device disposed at the remote location, the obtained signals including those that are representative of real sights and real sound captured at the remote location by the remote capture device and are thus representative of real aspects of the remote location, the remote capture device being part of a remote system that is operatively coupled via a network to a local system having a local capture device disposed at the local location, the remote capture device including a respective remote depth camera;
presenting at the local location, a respective local representation of the remote location including that derived from the obtained video and audio signal that are respectively representative of real sights and real sound as captured by the remote capture device, the local representation including a displayed representation presented on a local display proximate to the local capture device;
tracking movements of a local user in a space proximate to the local capture device; and
responsive to a user's local gesture detected by the local capture device, controlling the remote system to alter how it captures and processes reality representing signals at the remote location including altering processing of audio or visual signals by the remote system such that the respective local representation of real aspects of the remote location is correspondingly altered, said altering including altering of processing of depth based visual signals having a depth attribute provided by the remote depth camera.

2. The method of claim 1 wherein:
the remote capture device includes a respective remote array of audio sensors;
the local gesture includes an audio control gesture configured to alter an audio focus of the remote capture device by altering of processing at the remote location of sensed audio signals provided by the remote array of audio sensors such that the respective local representation of real audio aspects of the remote location is correspondingly altered.

3. The method of claim 2 wherein the local audio control gesture causes an audio input at the remote location to increase or decrease in volume for a focused-upon remote region proximate to the remote capture device.

4. The method of claim 1 wherein the local gesture includes a video control gesture configured to alter a predetermined video processing at the remote location of a video signal that is representative of real sights obtained from beyond a gesture indicated distance away from and captured by the remote capture device.

5. The method of claim 4 wherein the local video control gesture causes a video processing carried out by the remote system to change such that the respective local representation of the remote location beyond the indicated distance is correspondingly altered.

6. The method of claim 1 further including the step of presenting a user interface responsive to the user gesture, the user interface presenting additional input options to the local user to alter presentation of the video conference.

7. The method of claim 1 wherein the gesture comprises a human motion interaction with a projection of the remote environment on the display.

8. The method of claim 1 wherein:
the local capture device includes a respective local depth camera;
the method further including receiving a control signal from the remote system and responsively altering at the local location video signals output from the local system to the remote location, said altering at the local location including altering of processing of depth based visual signals having a depth attribute provided by the local depth camera.

9. The method of claim 8 wherein the remote capture device includes one or more permissions determining whether to alter remote capture device processing responsive to the control input from the local capture device.

10. A gesture controlled video conferencing apparatus configured for providing a video conference between a local environment and a remote environment, the apparatus comprising:
- a local capture device configured to detect movements of a local user in the local environment;
- an audio/visual display disposed in the local environment;
- a processor coupled to the local capture device, the processor being further coupled via a network to a combination of a remote capture device and a remote processor disposed at the remote environment, the remote capture device including a respective remote depth camera, the processor including code instructing the processor to:
- render a representation of the remote environment on the audio/visual display, the rendered representation including at least one of reality representing audio and video portions corresponding to real sights and real sounds captured and processed at the remote environment;
- track movements of the local user in a space proximate to the local capture device; and
- responsive to a predetermined user gesture detected at the local capture device, alter a corresponding visual portion of the rendered representation of real sights and real sounds captured and processed at the remote environment, the altering at the remote environment including altering of processing of depth based visual signals having a depth attribute provided by the remote depth camera, whereby due to the altering at the remote environment, the reality representing representation of the real sights of the remote environment is altered locally on the audio/visual display.

11. The video conferencing apparatus of claim 10 wherein:
- the remote capture device includes a respective remote array of audio sensors;
- the local processing device is configured to output a control signal to the remote environment that causes an altering of processing at the remote environment of sensed audio signals provided by the remote array of audio sensors so as to thereby cause an alteration of an audio focus provided by the remote capture device.

12. The video conferencing apparatus of claim 11 wherein the user gesture is configured to cause an audio input at the remote environment to correspondingly increase or decrease in volume for a focused-upon remote region proximate to the remote capture device.

13. The video conferencing apparatus of claim 10 wherein the gesture is configured to alter a predetermined video processing of an obtained video signal that is representative of real sights obtained from beyond a gesture indicated distance away from and captured by the remote capture device so as to thereby change the video representation at the local display.

14. The video conferencing apparatus of claim 10 wherein the local processing device outputs a control signal to the remote location the step of presenting a user interface responsive to the user gesture, the user interface presenting additional input options to the local user to alter presentation of the video conference.

15. The video conferencing apparatus of claim 10 wherein the processor includes instructions for receiving a control signal from the remote processing device and altering video and audio signals output to the remote location.

16. A gesture controlled video conferencing apparatus configured for providing a video conference between a local first physical environment and a remote second physical environment, the apparatus comprising:
- a depth and image capture device configured to detect movements of a user in the first physical environment;
- an audio/visual display disposed in the first physical environment;
- a first processor coupled to the capture device and the audio/visual display, the processor being further coupled via a network to a second depth and image capture device and a second processor disposed in the remote second physical environment, the second depth and image capture device being configured to capture real aspects of the second physical environment and to provide corresponding audio visual signals, the first processor including code instructing the first processor to:
- render a representation of real aspects of the second physical environment on the display responsive to the corresponding audio visual signals provided by the second depth and image capture device;
- present a user interface on the audio/visual display, the user interface responsive to gestures from the user;
- track movements of the user in a space proximate to the first capture device and responsive to a predetermined user gesture by the user, presenting a user interface allowing the user a set of one or more controls for altering how the second depth and image capture device is used for capturing and processing reality representing signals at the second physical environment to thereby alter the representation of the real aspects of the remote second physical environment as rendered on the audio/visual display.

17. The gesture controlled video conferencing apparatus of claim 16 wherein the predetermined gesture includes a region identifying selection of a region of the display proximate to a remote user represented in the display.

18. The gesture controlled video conferencing apparatus of claim 17 wherein the predetermined gesture includes a manipulation type identification indicative of a desired type of manipulating of the presentation of the region selected in the display.

19. The gesture controlled video conferencing apparatus of claim 18 wherein the processor includes instructions for receiving a control signal from the remote processing device and for responsively altering video and audio signals output to the remote location, the responsively altered video and audio signals including those representing real aspects of the local first physical environment.

20. The gesture controlled video conferencing apparatus of claim 19 wherein the processor includes one or more permissions determining whether to alter local processing in response to the received control signal from the remote location.

* * * * *